United States Patent
Shouji et al.

[11] Patent Number: 5,611,965
[45] Date of Patent: Mar. 18, 1997

[54] PLASTIC OPTICAL FILTER

[75] Inventors: Masuhiro Shouji; Takeo Ogihara; Hiroki Katono; Teruo Sakagami, all of Iwaki, Japan

[73] Assignee: Kureha Kagaku Kogyo Kabushiki Kaisha, Tokyo, Japan

[21] Appl. No.: 519,731

[22] Filed: Aug. 28, 1995

[30] Foreign Application Priority Data

Sep. 7, 1994 [JP] Japan .................................. 6-239373

[51] Int. Cl.$^6$ ................... F21V 9/00; F21V 9/04
[52] U.S. Cl. ................... 252/582; 252/587; 359/885
[58] Field of Search ................... 252/582, 587; 359/885

[56] References Cited

U.S. PATENT DOCUMENTS

| | | | |
|---|---|---|---|
| 5,236,633 | 8/1993 | Satake et al. | 252/587 |
| 5,237,452 | 8/1993 | Okayama et al. | 359/574 |
| 5,354,514 | 10/1994 | Satake et al. | 252/587 |
| 5,434,709 | 7/1995 | Yamada et al. | 359/569 |
| 5,466,755 | 11/1995 | Sakagami et al. | 359/885 |

FOREIGN PATENT DOCUMENTS

| | | |
|---|---|---|
| 0100519 | 2/1984 | European Pat. Off. . |
| 0586135 | 3/1994 | European Pat. Off. . |
| 6-118228 | 4/1994 | Japan . |

OTHER PUBLICATIONS

Patent Abstracts of Japan, vol. 015, No. 005 (P-1149), 8 Jan. 1991 of JP-A-02 254401 (Hoya Corp), 15 Oct. 1990.
Patent Abstracts of Japan, vol. 008, No. 117 (P-277), 31 May 1984 of JP-A-59 023306 (Kyowa Gas Kagaku Kogyo KK), 6 Feb. 1984.

*Primary Examiner*—Philip Tucker
*Attorney, Agent, or Firm*—Frishauf, Holtz, Goodman, Langer & Chick, P.C.

[57] ABSTRACT

Disclosed herein is a plastic optical filter which has a combined optical function that it has an effect of effectively blocking or attenuating rays in the wavelength range of a near infrared region and excellent luminosity factor-compensating ability and is provided with an optical low-pass filtering function, and is low in specific gravity and hygroscopicity, free from devitrification with time and easy to conduct its processing or machining and polishing treatment.

This plastic optical filter includes a filter base formed of a plastic material comprising a copolymer obtained by copolymerizing a monomer represented by the following formula I:

$$PO(OH)_n R_{3-n} \qquad I$$

wherein R means a polymerizable functional group represented by the following formula II:

$$CH_2=CXCOO(C_2H_4O)_m- \qquad II$$

in which X denotes a hydrogen atom or a methyl group, and m is an integer of 1–5, and n is 1 or 2, with at least one monomer copolymerizable therewith, and an ionic metal component composed of a copper ion incorporated in the copolymer, and a phase grating formed on a surface of the filter base.

10 Claims, No Drawings

PLASTIC OPTICAL FILTER

BACKGROUND OF THE INVENTION

1) Field of the Invention

The present invention relates to a plastic optical filter, and particularly to an optical filter formed of an acrylic resin, which has an effect of blocking or attenuating rays in the wavelength range of a near infrared region with high efficiency, excellent luminosity factor-compensating ability and besides an optical low-pass filtering function.

2) Description of the Background Art

Optical filters made of glass, in which a copper ion is incorporated in a special phosphate glass material, have heretofore been used as photometric filters and luminosity factor-compensating filters for cameras. These optical filters made of glass, however, have involved such many problems as they are high in specific gravity and hence heavy, high in hygroscopicity, easy to devitrify with time and difficult to process-or machine and polish upon their production. Under the foregoing circumstances, there has thus been a strong demand for provision of a plastic optical filter which has good properties for an optical filter, and at the same time has an optical low-pass filtering function and moreover is low in specific gravity and hygroscopicity and easy to process or machine and polish upon its production.

SUMMARY OF THE INVENTION

The present invention has been made in view of the foregoing circumstances and has as its object the provision of a plastic optical filter which has a combined optical function that it has an effect of blocking or attenuating rays in the wavelength range of a near infrared region with high efficiency and excellent luminosity factor-compensating ability, and at the same time has an optical low-pass filtering function, and moreover is low in specific gravity and hygroscopicity and easy to process or machine and polish upon its production.

According to the present invention, there is thus provided a plastic optical filter comprising a filter base formed of a plastic material comprising a copolymer obtained by copolymerizing a phosphate group-containing acrylic or methacrylic monomer represented by the following formula I:

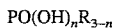   I wherein R means a polymerizable functional group represented by the following formula II:

   II in which X denotes a hydrogen atom or a methyl group, and m is an integer of 1–5, and n is 1 or 2, with at least one monomer copolymerizable therewith, and an ionic metal component composed of a copper ion incorporated in the copolymer, and a phase grating formed on a surface of the filter base.

In the plastic optical filter according to the present invention, the phase grating may be constructed, for example, by grooves cut directly in a surface of the filter base, but may also be formed on a transparent resin layer laminated on the surface of the filter base. As a material for forming this transparent resin layer, there may be suitably used any photosensitive resin as mentioned later.

In the plastic optical filter according to the present invention, the filter base constituting this filter is formed of a plastic material composed of the copolymer comprising, as essential component, the phosphate group-containing acrylic or methacrylic monomer, and the ionic metal component composed of a copper ion incorporated in the copolymer. Therefore, the filter base is low in specific gravity and hygroscopicity, free from devitrification with time, easy to conduct its processing or machining and polishing treatment, and has optical properties that it can block or attenuate rays in the wavelength range of a near infrared region with high efficiency and has excellent luminosity factor-compensating ability. An optical low-pass filtering function is superimposed by the phase grating formed on the surface of this filter base. Accordingly, the plastic optical filter according to the present invention is extremely useful as an optical filter for light from a subject in, for example, a video camera or the like.

DETAILED DESCRIPTION OF THE INVENTION AND PREFERRED EMBODIMENTS

The present invention will hereinafter be described in detail.

The filter base, one of the principal elements constituting the plastic optical filter according to the present invention, is formed of a plastic material comprising a copolymer obtained from a monomer mixture containing a specific phosphate group-containing acrylic or methacrylic monomer and at least one monomer copolymerizable therewith, and an ionic metal component composed of a copper ion incorporated in a specified proportion in the copolymer.

In order to obtain the copolymer, which is a resin component constituting the filter base, an acrylic monomer or a methacrylic monomer represented by the formula I (hereinafter the monomer may be referred to as "a specific phosphate group-containing monomer") is used as an essential component.

This specific phosphate group-containing monomer contains an acryloyloxy group or a methacryloyloxy group as a radical-polymerizable functional group, and is extremely high in radical polymerizability and hence copolymerizable with various monomers. The bonding of the phosphate group in this specific phosphate group-containing monomer to the copper ion permits the provision of a plastic material which absorbs rays in the wavelength range of a near infrared region with high efficiency without impairing high light transmittance in a visible region. The present invention has the greatest feature in that such a special plastic material is used as a material for the filter base.

A phase grating is formed on a surface of the filter base formed of this plastic material, thereby permitting the provision of an optical filter having a combined optical function as is the optical properties inherent in the plastic material of the filter base combined with an effective optical low-pass filtering function owing to the phase grating.

As represented by the formula II, the group R in the formula I is an acryloyloxy group to which at least one ethylene oxide group has been bonded when X is a hydrogen atom, or a methacryloyloxy group to which at least one ethylene oxide group has been bonded when X is a methyl group. The recurring number m of the ethylene oxide groups is an integer of 1–5. Any value of m exceeding 5 results in a copolymer greatly lowered in hardness. Therefore, any practicable filter base cannot be provided.

The number n of the hydroxyl groups in the formula I is selected from 1 and 2 as necessary for the end application of the resulting copolymer. A specific phosphate group-containing monomer in which the value of n is 2 is a monomer which is high in bonding ability to the ionic metal component such as a copper ion and has one radical-polymerizable functional group. On the other hand, a specific phosphate group-containing monomer in which the value of n is 1 has two radical-polymerizable functional groups and hence is crosslink-polymerizable. Accordingly, in the case where the filter base constituting the plastic optical filter according to the present invention is produced by injection molding or extrusion, which is a common molding or forming process for thermoplastic resins, it is preferable to use the specific phosphate group-containing monomer in which the number of n is 2. Of course, the molding or forming process for the copolymer is not limited to these processes in the present invention.

As described above, the value of n may be selected according to the performance, molding or forming process and intended end application of the resulting filter base. However, the specific phosphate group-containing monomer in which the value of n is 1 and the specific phosphate group-containing monomer in which the value of n is 2 may preferably be used in combination. In particular, the combined use of the monomer in which the value of n is 1 with the monomer in which the value of n is 2 in a molar ratio of 1:5 to 5:1 is preferred because the solubility of a metallic compound, which is a supply source of the ionic metal component composed of a copper ion, in such a monomer mixture becomes high.

As the copolymer constituting the filter base, which is one of the principal elements of the plastic optical filter according to the present invention, there is used a copolymer of the specific phosphate group-containing monomer with at least one monomer copolymerizable therewith (hereinafter referred to as "a copolymerizable monomer"). The reason why such a copolymer is used is that it would be difficult to provide a good optical filter because a homopolymer obtained by polymerizing the specific phosphate group-containing monomer alone is extremely high in hygroscopicity and high in softness and hence low in self-retention of shape.

The proportion of the specific phosphate group-containing monomer contained in the monomer mixture for obtaining the copolymer for the filter base is preferably 3–60 parts by mass based on 100 parts by mass of the monomer mixture. If the proportion of the specific phosphate group-containing monomer is lower than 3 parts by mass, it is impossible to provide a filter base having favorable optical properties. On the other hand, any proportion exceeding 60 parts by mass results in a copolymer high in hygroscopicity and too soft to provide a molded product excellent in self-retention of shape. It is thus impossible to obtain a good optical filter.

In the present invention, the copolymerizable monomer which is copolymerized with the specific phosphate group-containing monomer is required to have the following properties:

(1) being miscible and soluble uniformly with the specific phosphate group-containing monomer used;

(2) having good radical polymerizability with the specific phosphate group-containing monomer used; and (3) being able to provide an optically transparent copolymer.

No particular limitation is imposed on the kind of the copolymerizable monomer so far as the monomer satisfies these properties.

As specific examples of such a copolymerizable monomer, may be mentioned monofunctional acrylates and methacrylates such as methyl acrylate, methyl methacrylate, ethyl acrylate, ethyl methacrylate, 2-hydroxyethyl acrylate, 2-hydroxyethyl methacrylate, n-propyl acrylate, n-propyl methacrylate, 2-hydroxypropyl acrylate, 2-hydroxypropyl methacrylate, n-butyl acrylate, n-butyl methacrylate, isobutyl acrylate, isobutyl methacrylate, 2-hydroxybutyl acrylate, 2-hydroxybutyl methacrylate, n-hexyl acrylate, n-hexyl methacrylate, n-heptyl acrylate, n-heptyl methacrylate, n-octyl acrylate, n-octyl methacrylate, 2-ethylhexyl acrylate, 2-ethylhexyl methacrylate, glycidyl acrylate, glycidyl methacrylate, 2-hydroxy-3-phenoxypropyl acrylate, 2-hydroxy-3-phenoxypropyl methacrylate, phenoxypolyethylene glycol acrylate, phenoxypolyethylene glycol methacrylate, methoxypolyethylene glycol acrylate, methoxypolyethylene glycol methacrylate, 3-chloro-2-hydroxypropyl acrylate and 3-chloro-2-hydroxypropyl methacrylate; polyfunctional acrylates and methacrylates such as ethylene glycol diacrylate, ethylene glycol dimethacrylate, diethylene glycol diacrylate, diethylene glycol dimethacrylate, polyethylene glycol diacrylate, polyethylene glycol dimethacrylate, polypropylene glycol diacrylate, polypropylene glycol dimethacrylate, 1,3-butylene glycol diacrylate, 1,3-butylene glycol dimethacrylate, 1,4-butanediol diacrylate, 1,4-butanediol dimethacrylate, 1,6-hexanediol diacrylate, 1,6-hexanediol dimethacrylate, neopentyl glycol diacrylate, neopentyl glycol dimethacrylate, 2-hydroxy-1,3-dimethacryloxypropane, 2,2-bis[4-(methacryloxyethoxy)phenyl]propane, 2-hydroxy-1-acryloxy-3-methacryloxypropane, trimethylolpropane triacrylate, trimethylolpropane trimethacrylate, pentaerythritol triacrylate, pentaerythritol trimethacrylate, pentaerythritol tetraacrylate and pentaerythritol tetramethacrylate; unsaturated carboxylic acids such as acrylic acid, methacrylic acid, 2-methacryloyloxyethyl-succinic acid and 2-methacryloyloxyethylphthalic acid; and aromatic vinyl compounds such as styrene, α-methylstyrene, chlorostyrene, dibromostyrene, methoxystyrene, divinylbenzene, vinylbenzoic acid, hydroxymethylstyrene and trivinylbenzene. These compounds may be used either singly or in any combination thereof.

The copolymer constituting the filter base, which is a principal element for the plastic optical filter according to the present invention, can be obtained by radical-polymerizing a monomer mixture composed of a specific phosphate group-containing monomer and a copolymerizable monomer. In this case, the radical polymerization of the monomer mixture may be performed in a state that a metallic compound, which is a supply source of the ionic metal component that is another essential component for the plastic material according to the present invention and will be described subsequently, has been mixed with the monomer mixture into a solution.

No particular limitation is imposed on the radical polymerization process employed. Any known process making use of a usual radical polymerization initiator, such as bulk (cast) polymerization, suspension polymerization, emulsion polymerization or solution polymerization, may be used.

The ionic metal component incorporated in the plastic material constituting the filter base of the present invention serves to absorb rays in the wavelength range of a near infrared region with high efficiency in interaction with the phosphate group in the copolymer.

This ionic metal component is composed of a divalent copper ion. A small amount of other metal ions may be contained without problems. In order for the resulting filter base to achieve the performance that rays in the wavelength range of a near infrared region are absorbed with high efficiency, however, it is necessary that the proportion of the copper ion contained in all the metal ions constituting the ionic metal component amount to at least 80 mass %.

The ionic metal component composed of the copper ion is preferably used in a proportion of 0.1–20 parts by mass based on 100 parts by mass of the copolymer.

Any proportion of the ionic metal component lower than 0.1 part by mass results in a filter base which fails to absorb rays in the wavelength range of a near infrared region with high efficiency. On the other hand, any proportion exceeding 20 parts by mass results in difficulty in dispersing such ionic metal component in the copolymer.

In the present invention, the copper ion may be supplied into the copolymer in the form of various kinds of copper compounds. As specific examples thereof, may be mentioned anhydrides and hydrides of copper acetate, copper chloride, copper formate, copper stearate, copper benzoate, copper ethylacetoacetate, copper pyrophosphate, copper naphthenate, copper citrate and the like. However, the copper compounds are not limited to these compounds only.

In the present invention, other metal ions such as sodium, potassium, calcium, iron, manganese, cobalt, magnesium, nickel and zinc ions may also be incorporated in the copolymer within limits not exceeding 20 mass % of the total mass of all the metal ions as necessary for the end application intended.

No particular limitation is imposed on the specific means for incorporating the ionic metal component composed of the copper ion into the copolymer. However, the following two means may preferably be employed.

(1) A means in which the copper compound is dissolved in the monomer mixture for obtaining the copolymer, thereby preparing a monomer composition, and this monomer composition is subjected to radical polymerization.

In this means, the ionic metal component composed of the copper ion is contained in the resulting copolymer. This copolymer is used as a plastic material and polished as it is or after formed into a form intended, for example, a plate, thereby obtaining a filter base.

(2) A means in which the specific phosphate group-containing monomer is copolymerized with the copolymerizable monomer, and the metallic compound for supplying the ionic metal component composed of the copper ion is added to the resultant copolymer to blend the resultant mixture.

In the latter means, as a process for adding the metallic compound to the copolymer, may be used a process in which the metallic compound is added to the copolymer in a state that the copolymer has been melted, and the resultant molten mixture is blended, a process in which the copolymer is dissolved or dispersed in water or an organic solvent, and the metallic compound is added to this solution or dispersion to blend the resultant mixture, or the like.

The plastic material for the filter base according to the present invention, which is composed of the copolymer containing the ionic metal component composed of the copper ion, can be obtained by any process as described above.

This plastic material is molded or formed into, for example, a plate as necessary for the end application intended, and the thus-obtained plate is polished, thereby obtaining a filter base.

In the present invention, a phase diffraction grating is formed on a surface of the filter base formed of such a plastic material, thereby imparting a low-pass filtering function to the filter base.

The formation of this phase grating on the filter base permits the limitation of a high spatial frequency component of transmitted light, and so the resulting optical filter is useful as an optical filter capable of removing color components different from that of a subject, which are attendant on the generation of false signals, in, for example, a video camera or the like.

As described above, the optical filter according to the present invention comprises, as principal elements, the filter base formed of a specified plastic material and the phase grating, and hence has excellent luminosity factor-compensating ability, absorbs rays in the wavelength of a near infrared region to a great extent and also has an optical low-pass filtering function.

This phase grating for imparting the optical low-pass filtering function can be directly provided on at least portions of one or both sides of the filter base, through which light transmits, by cutting grooves in a line or lattice form, the sectional shape for giving the intended spatial cutoff frequency of which is rectangular or sinusoidal.

Specific examples of a process for defining the grooves constituting the phase grating include (a) a process in which a mold made of, for example, glass, in the inner surface of which grooves according to a negative pattern corresponding to the phase grating have been cut, is used, and a raw material such as the monomer composition is cast into this mold to conduct cast polymerization, thereby directly producing an optical filter, on the surface of which the pattern of the phase grating has been formed, by molding of the plastic material, (b) a process in which a mold, on the molding surface of which a negative pattern corresponding to the phase grating has been stamped, is used to mold an optical filter, on the surface of which the phase grating has been formed, by injection molding, and (c) a process in which a stamper, in which a negative pattern corresponding to the phase grating has been formed, is heated and brought into contact with a surface of a filter base formed into a plate, thereby forming a pattern of the phase grating on the surface of the filter base.

The phase grating may be provided by cutting grooves in members for forming a phase grating formed of a transparent resin layer, which have been laminated on one or both sides of the filter base. Specific examples of such a process include a process in which a photosensitive resin is evenly coated on a surface of the filter base, and the photosensitive resin layer thus formed is exposed according to a pattern of the phase grating by using a mask pattern and developed, thereby defining grooves constituting the phase grating in the photosensitive resin layer and a process in which a phase grating is formed on a filmy material composed of an optical resin excellent in transparency, and this film on which the phase grating has been formed is laminated on one or both sides of the filter base.

In case where the member for forming a phase grating is laminated on the filter base, it is not always necessary to use an adhesive or pressure sensitive adhesive for laminating the phase grating member on the filter base. However, a thermosetting or photosetting adhesive or pressure sensitive adhesive excellent in transparency, for example, an epoxy, urethane or acrylic adhesive, or an acrylic pressure sensitive adhesive excellent in transparency and weather resistance, may preferably be used if desired.

The present invention will hereinafter be described by the following examples. However, this invention is not limited to and by these examples.

All designations of "part" or "parts" as will be used in the following examples mean part or parts by mass.

EXAMPLE 1

A specific phosphate group-containing monomer represented by the following formula III in an amount of 32 parts and another specific phosphate group-containing monomer represented by the following formula IV in an amount of 13 parts were thoroughly mixed with 34 parts of methyl methacrylate, 20 parts of diethylene glycol dimethacrylate and 1 part of α-methylstyrene. To this monomer mixture, were added 32 parts of anhydrous copper benzoate. The resultant mixture was thoroughly stirred and mixed at 80° C. into a solution to obtain a monomer composition in which anhydrous copper benzoate was dissolved in the monomer mixture.

In this monomer composition, a molar ratio of the specific phosphate group-containing monomer represented by the formula III to the specific phosphate group-containing monomer represented by the formula IV was about 1:1, and a proportion of a copper ion contained in the monomer composition was 6.6 parts based on 100 parts of the monomer composition.

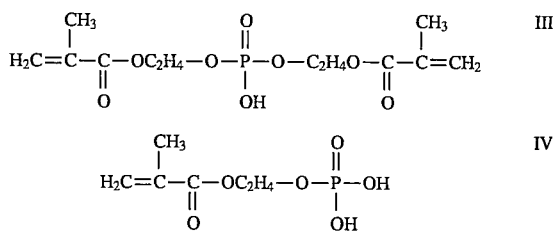

Two parts of t-butyl peroxy(2-ethylhexanoate) were added to the monomer composition thus prepared. The resultant monomer mixture was cast in a glass mold and successively heated at varied temperatures as 55° C. for 16 hours, 70° C. for 8 hours and 100° C. for 2 hours to conduct cast polymerization, thereby obtaining a crosslinked copolymer containing a copper ion therein and having excellent transparency.

The thus-obtained copolymer was cut into a plate 1 mm thick. Benzoic acid, which was a reaction product of the copper compound and the phosphate group, was extracted and removed from this plate, and the plate was then subjected to surface polishing, thereby producing a filter base 1.

On the other hand, a photosensitive resin composition obtained by incorporating 10% of 3-benzoylbenzophenone into a copolymer obtained from crotyl methacrylate and methyl methacrylate was dissolved in toluene to give a solid concentration of 4%, thereby preparing a coating fluid of the photosensitive resin. This coating fluid was applied onto one side of the above-obtained filter base 1. The coated base thus-obtained was subjected to a heat treatment at 60° C. for 30 minutes to remove toluene, thereby forming a photosensitive film 2 μm thick on the surface of the filter base 1. This photosensitive film was then exposed for 10 minutes to ultraviolet radiation having a light intensity of 30 mW/cm$^2$ at a wavelength of 365 nm through a photomask on which a pattern had been formed, and then developed, thereby forming a phase grating having a pitch of 160 μm and a sinusoidal sectional shape to produce a plastic optical filter 1.

The optical filter 1 thus obtained was mounted in a video camera to perform an actual picture test. As a result, noise due to a moire pattern and aliasing strain was reduced as compared with the case where no optical filter 1 was mounted. By this fact, it was confirmed that this optical filter 1 has an effective optical low-pass filtering function.

The spectral transmittances of this optical filter 1 were measured by a spectrophotometer. As a result, it was found that the light transmittances in a visible region are as high as at least 60% and hence excellent in transparency. On the other hand, the light transmittances in a near infrared region of 700–1,000 nm in wavelength are 10% or lower, and so the optical filter 1 was recognized to absorb rays in the wavelength range of the near infrared region with high efficiency.

EXAMPLE 2

The same specific phosphate group-containing monomers represented by the formulae III and IV as those used in Example 1 in amounts of 49 parts and 21 parts, respectively, were thoroughly mixed with 27 parts of methyl methacrylate, 2 parts of diethylene glycol dimethacrylate and 1 part of α-methylstyrene. To this monomer mixture, were added 20 parts of anhydrous copper acetate. The resultant mixture was thoroughly stirred and mixed at 40° C. into a solution to obtain a monomer composition in which anhydrous copper acetate was dissolved in the monomer mixture.

In this monomer composition, a molar ratio of the specific phosphate group containing monomer represented by the formula III to the specific phosphate group-containing monomer represented by the formula IV was about 1.5:1, and a proportion of a copper ion contained in the monomer composition was 7.0 parts based on 100 parts of the monomer composition.

Three parts of t-butyl peroxypivalate were added to the monomer composition thus prepared. The resultant monomer mixture was cast in a glass mold in which a pair of mold members were opposite to each other at an interval of 1 mm and a negative pattern corresponding to a phase grating formed of rectangular grooves defined to a depth of 0.4 μm in section at a pitch of 160 μm had been formed on the inner surface of one of the mold members, and successively heated at varied temperatures as 45° C. for 16 hours, 60° C. for 28 hours and 90° C. for 3 hours to conduct cast polymerization, thereby obtaining an optical filter 2 formed of a crosslinked copolymer containing a copper ion therein.

The surface of the optical filter 2 thus obtained was observed through a scanning electron microscope. As a result, it was confirmed that a form corresponding to the negative pattern of the phase grating formed in the glass mold is transferred, thereby forming the phase grating on the surface of the filter base.

This optical filter 2 was mounted in a video camera to perform an actual picture test. As a result, as with the optical filter 1 according to Example 1, it was confirmed that this optical filter 2 has an effective optical low-pass filtering function.

The spectral transmittances of this optical filter 2 were measured by a spectrophotometer. As a result, it was found that the spectral transmittances are at the same level as the optical filter 1 according to Example 1, and so the optical filter 2 is high in light transmittances in a visible region and excellent in light absorption in a near infrared region.

What is claimed is:

1. A plastic optical filter comprising a filter base formed of a plastic material comprising a copolymer obtained by copolymerizing a first monomer represented by the following formula I:

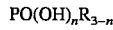

wherein R means a polymerizable functional group represented by the following formula II:

in which X denotes a hydrogen atom or a methyl group, and m is an integer of 1–5, and n is 1 or 2, with at least one second monomer copolymerizable therewith, and an ionic metal component composed of a copper ion incorporated in the copolymer;

said plastic material having been cast polymerized in a mold having an inner surface on which a negative pattern of a phase grating is formed, to form a phase grating on a surface of the filter base and wherein said second monomer is miscible and soluble uniformly with the first monomer, has good radical polymerizability with the first monomer, and forms an optically transparent copolymer.

2. The plastic optical filter according to claim 1, wherein the ionic metal component composed of a copper ion is contained in a proportion of 0.1–20 parts by mass based on 100 parts by mass of the copolymer.

3. The plastic optical filter of claim 1 wherein the second monomer is selected from the group consisting of monofunctional acrylates and methacrylates, polyfunctional acrylates and methacrylates, and unsaturated carboxylic acids.

4. The plastic optical filter of claim 1 wherein the second monomer is selected from the group consisting of methyl acrylate, methyl methacrylate, ethyl acrylate, ethyl methacrylate, 2-hydroxyethyl acrylate, 2-hydroxyethyl methacrylate, n-propyl acrylate, n-propyl methacrylate, 2-hydroxypropyl acrylate, 2-hydroxypropyl methacrylate, n-butyl acrylate, n-butyl methacrylate, isobutyl acrylate, isobutyl methacrylate, 2-hydroxybutyl acrylate, 2-hydroxybutyl methacrylate, n-hexyl acrylate, n-hexyl methacrylate, n-heptyl acrylate, n-heptyl methacrylate, n-octyl acrylate, n-octyl methacrylate, 2-ethylhexyl acrylate, 2-ethylhexyl methacrylate, glycidyl acrylate, glycidyl methacrylate, 2-hydroxy-3-phenoxypropyl acrylate, 2-hydroxy-3-phenoxypropyl methacrylate, phenoxypolyethylene glycol acrylate, phenoxypolyethylene glycol methacrylate, methoxypolyethylene glycol acrylate, methoxypolyethylene glycol methacrylate, 3-chloro-2-hydroxypropyl acrylate; 3-chloro-2-hydroxypropyl methacrylate; ethylene glycol diacrylate, ethylene glycol dimethacrylate, diethylene glycol diacrylate, diethylene glycol dimethacrylate, polyethylene glycol diacrylate, polyethylene glycol dimethacrylate, polypropylene glycol diacrylate, polypropylene glycol dimethacrylate, 1,3-butylene glycol diacrylate, 1,3-butylene glycol dimethacrylate, 1,4-butanediol diacrylate, 1,4-butanediol dimethacrylate, 1,6-hexanediol diacrylate, 1,6-hexanediol dimethacrylate, neopentyl glycol diacrylate, neopentyl glycol dimethacrylate, 2-hydroxy-1,3-dimethacryloxypropane, 2,2-bis[4-(methacryloxyethoxy)phenyl]propane, 2-hydroxy-1-acryloxy-3-methacryloxypropane, trimethylolpropane triacrylate, trimethylolpropane trimethacrylate, pentaerythritol triacrylate, pentaerythritol trimethacrylate, pentaerythritol tetraacrylate; pentaerythritol tetramethyacrylate; acrylic acid, methacrylic acid, 2-methacryloyloxyethyl-succinic acid; 2-methacryloyloxyethyl-phthalic acid; styrene, α-methylstyrene, chlorostyrene, dibromostyrene, methoxystyrene, divinylbenzene, vinylbenzoic acid, hydroxymethylstyrene, trivinylbenzene and any combination thereof.

5. The plastic optical filter of claim 1, wherein the copolymer is obtained by copolymerizing a monomer mixture of said first and second monomers and wherein said first monomer is used in an amount of 3–60 parts by mass based on 100 parts by mass of the monomer mixture.

6. The plastic optical filter of claim 5, wherein said ionic metal component is contained in an amount of 0.1–20 parts by mass based on 100 parts by mass of the copolymer, said ionic metal component comprising at least 80 mass % copper ion.

7. The plastic optical filter of claim 3, wherein the copolymer is obtained by copolymerizing a monomer mixture of said first and second monomers and wherein said first monomer is used in an amount of 3–60 parts by mass based on 100 parts by mass of the monomer mixture.

8. The plastic optical filter of claim 7, wherein said ionic metal component is contained in an amount of 0.1–20 parts by mass based on 100 parts by mass of the copolymer, said ionic metal component comprising at least 80 mass % copper ion.

9. The plastic optical filter of claim 4, wherein the copolymer is obtained by copolymerizing a monomer mixture of said first and second monomers and wherein said first monomer is used in an amount of 3–60 parts by mass based on 100 parts by mass of the monomer mixture.

10. The plastic optical filter of claim 9, wherein said ionic metal component is contained in an amount of 0.1–20 parts by mass based on 100 parts by mass of the copolymer, said ionic metal component comprising at least 80 mass % copper ion.

* * * * *